United States Patent
Beliveau et al.

(10) Patent No.: US 9,413,667 B2
(45) Date of Patent: Aug. 9, 2016

(54) METHODS AND NETWORK NODES FOR TRAFFIC STEERING BASED ON PER-FLOW POLICIES

(71) Applicant: TELEFONAKTIEBOLAGET L M ERICSSON (PUBL), Stockholm (SE)

(72) Inventors: Ludovic Beliveau, Montreal (CA); Ravi Manghirmalani, Fremont, CA (US); Meral Shirazipour, Brossard (CA); Catherine Truchan, Lorraine (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 85 days.

(21) Appl. No.: 13/768,956

(22) Filed: Feb. 15, 2013

(65) Prior Publication Data

US 2014/0233385 A1 Aug. 21, 2014

(51) Int. Cl.
*H04L 12/803* (2013.01)
*H04L 29/08* (2006.01)
*H04L 12/801* (2013.01)

(52) U.S. Cl.
CPC ............ *H04L 47/122* (2013.01); *H04L 67/148* (2013.01); *H04L 47/19* (2013.01)

(58) Field of Classification Search
None
See application file for complete search history.

(56) References Cited

U.S. PATENT DOCUMENTS

| | | | |
|---|---|---|---|
| 8,244,864 B1 * | 8/2012 | Bahl et al. ..................... 709/225 |
| 8,295,284 B1 | 10/2012 | Singh et al. | |
| 8,675,488 B1 * | 3/2014 | Sidebottom ........... H04L 67/141 370/229 |
| 9,038,151 B1 * | 5/2015 | Chua ...................... H04L 67/327 709/223 |
| 2006/0129630 A1 * | 6/2006 | Catalina-Gallego et al. .. 709/203 |
| 2007/0253371 A1 * | 11/2007 | Harper et al. .................. 370/331 |
| 2008/0137615 A1 * | 6/2008 | Park et al. ...................... 370/332 |
| 2011/0058479 A1 * | 3/2011 | Chowdhury .................. 370/237 |
| 2011/0075557 A1 * | 3/2011 | Chowdhury et al. ......... 370/230 |
| 2012/0106554 A1 * | 5/2012 | Ng et al. ........................ 370/392 |
| 2012/0246325 A1 | 9/2012 | Pancorbo Marcos et al. | |
| 2013/0077491 A1 * | 3/2013 | Cherian et al. ................ 370/235 |
| 2013/0272305 A1 * | 10/2013 | Lefebvre ................. H04L 47/24 370/392 |
| 2013/0311675 A1 * | 11/2013 | Kancherla ..................... 709/244 |
| 2013/0332983 A1 * | 12/2013 | Koorevaar .............. H04L 63/20 726/1 |
| 2014/0010083 A1 * | 1/2014 | Hamdi et al. ................. 370/235 |
| 2014/0229945 A1 * | 8/2014 | Barkai et al. ..................... 718/1 |

FOREIGN PATENT DOCUMENTS

WO 2011/132155 A2 10/2011
WO 2012/047885 A1 4/2012

OTHER PUBLICATIONS

OpenFlow Switch Specification, Version 1.1.0 Implemented (Wire Protocol 0x02), Feb. 28, 2011, pp. 1-56.

* cited by examiner

*Primary Examiner* — Timothy J Weidner (57) ABSTRACT

A method for redirecting a traffic flow in a communication network, in which a first or default service path has been configured for the traffic flow to go through is disclosed. The method comprises: receiving a notification message from a network node, the notification message including a traffic characteristic information of a packet of the traffic flow; creating a set of rules based on the received traffic characteristic information; and sending the set of rules to a plurality of switches in the communication network, the set of rules configuring a second or alternative service path to be used by subsequent packets of this traffic flow. Also, a network node for carrying out this method is provided.

27 Claims, 8 Drawing Sheets

METHODS AND NETWORK NODES FOR TRAFFIC STEERING BASED ON PER-FLOW POLICIES

TECHNICAL FIELD

This invention relates generally to systems and methods for steering traffic through a chain of inline services using Software Defined Networking.

BACKGROUND

Mobile and fixed network operators use various types of middleboxes or inline services to inspect and alter network traffic transiting through their network. These middleboxes, which will be referred to as services in this document, are often transparent to the end users and provide functionality such as transparent caching, virus scanning, deep packet inspection (DPI), firewalls, content filters, intrusion detection systems (IDS), network address translation (NAT), content caches, load balancers, wide area network (WAN) accelerators, multimedia transcoders, logging/metering/charging/advanced charging applications, etc. These services are usually packaged and sold as dedicated appliances (either physical or virtual) and are often expensive.

Network operators are facing a sharp increase in traffic demand and continue looking at new ways to monetize their network. Due to the high cost of service appliances, network operators want to avoid matching the capacity of these services with the growth of the traffic. Network operators would rather have the ability to selectively direct traffic to specific set of services instead of forcing all traffic through every service. This ability would allow a network operator to steer video traffic, which is a source of the recent traffic explosion, away from expensive services such as deep packet inspection, thus reducing the need for investing in new service appliances.

The ability to steer particular classes of traffic through predefined sets of services can also be used to enable new streams of revenue for network operators. A network operator could offer services such as virus scanning or content filtering to customers who elect to pay for such services. Alternatively, suspicious traffic could be dynamically re-directed or re-steered to services such as Intrusion Detection System (IDS)/Intrusion Protection Systems (IPS).

A service chain, or path, is an ordered set of services. Traffic steering refers to leading or directing the traffic through the right inline service path (i.e. specific service chains). Three broad classes of solutions are used today to implement some form of traffic steering and service chaining.

The first approach is to integrate the services within an extensible router or gateway. A network operator can add new services by adding additional service cards to its router or gateway.

The second approach is to configure one or more static service chains where each service is configured to send traffic to the next service in the chain. A router using Policy Based Routing (PBR) classifies the incoming traffic and forwards it to services at the head of each chain based on the result of the classification.

A third approach is to use a router using PBR, and for each service to be configured, to return traffic back to the router after processing it. The router classifies traffic after each service hop and forwards it to the appropriate service based on the result of the classification.

All three classes of solutions have drawbacks. The first approach does not support the integration with existing third party service appliances. This solution is proprietary and service vendors must port their applications to the software and hardware configuration supported by the router or gateway. This solution potentially suffers from a scalability issue as the number of services and the aggregated bandwidth is limited by the router's capacity.

The second approach does not support the definition of policies in a centralized manner and instead requires that each service be configured to classify and steer traffic to the appropriate next service. This approach requires a large amount of service specific configuration and can be error prone. The second approach also lacks flexibility as it does not support the steering of traffic on a per subscriber and per application basis and limits the different service chains that can be configured. Getting around these limitations would require additional configuration on each service to classify and steer traffic and automated ways to push these configurations dynamically as subscribers connect to the network.

The third approach also suffers from scalability issues as traffic is forced through the router after every service. The router must be able to handle N times the incoming traffic line rate to support a chain with N−1 services.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for redirecting a traffic flow in a communication network, in which a first service path has been configured for the traffic flow to go through. The method comprises: receiving a notification message from a service network node, the notification message including a traffic characteristic information of a packet of the traffic flow; creating a set of rules based on the received traffic characteristic information; and sending the set of rules to a plurality of switches in the communication network, the set of rules indicating a second service path to be used by subsequent packets of the traffic flow.

In a second aspect of the present invention, there is provided a network node for redirecting a traffic flow in a communication network, in which a first service path has been configured for the traffic flow to go through. The network node comprises: a communication interface for receiving a notification message from a service network node, the notification message including traffic characteristic information of a packet of the traffic flow; and a processor operationally connected to the communication interface and configured to create a set of rules based on the received traffic characteristic information. The communication interface further sends the set of rules to a plurality of switches in the communication network, the set of rules indicating a second service path to be used by subsequent packets of the traffic flow.

According to a third aspect of the present invention, there is provided a method for redirecting a traffic flow in a communication network, in which a first service path has been configured for the traffic flow to go through. The method comprises: receiving a set of rules from a network node, the set of rules being created based on a traffic characteristic information from a packet of the traffic flow, the set of rules defining a second service path for the traffic flow to go through; receiving subsequent packets of the traffic flow; and redirecting the received packets to follow the second service path as defined by the set of rules.

According to a fourth aspect of the present invention, there is provided a switch for redirecting a traffic flow in a communication network, in which a first service path has been configured for the traffic flow to go through. The switch comprises: a first communication interface for receiving a set of rules from a network node, the set of rules being created based on a traffic characteristic information extracted from a packet of the traffic flow, the set of rules defining a second service path for the traffic flow to go through; a second communication interface for receiving subsequent packets of the traffic flow; and a processor operationally connected to the first and second communication interfaces, and being configured to redirect the received packets to follow the second service path as defined by the set of rules.

According to a fifth aspect of the present invention, there is provided a method for redirecting a traffic flow in a communication network, in which a first service path has been configured for the traffic flow to go through. The method comprises: receiving a packet of the traffic flow; inspecting the received packet to obtain a traffic characteristic; and sending to a network node the traffic characteristic for the traffic flow so that the network node can create a set of rules based on the traffic characteristic, the set of rules defining a second service path for the traffic flow to go through.

According to a sixth aspect of the present invention, there is provided a service network node for redirecting a traffic flow in a communication network, in which a first service path has been configured for the traffic flow to go through. The service network node comprises a communication interface for receiving a packet of the traffic flow; and a processor operationally connected to the communication interface and configure for inspecting the received packet to obtain a traffic characteristic. The communication interface further sends to a network node the traffic characteristic for the traffic flow so that the network node can create a set of rules based on the traffic characteristic, the set of rules defining a second service path for the traffic flow to go through.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

The present invention is directed to network nodes and methods for redirecting traffic through a set of services.

Generally stated, embodiments of the present invention allow for steering or redirecting traffic on a per-flow basis in a communication network. To do so, a new protocol has been defined, which enables a service network node to send flow notifications to a centralized controller in communication with a plurality of switches. For example, the service network node is able to analyze and identify traffic flows at the layers 5 to 7 according to the Open Systems Interconnection (OSI) model, which represent the session, presentation and application layers. Based on this information and optionally on configured application or subscriber policies, the controller can create a new set of steering/forwarding rules which can be applied to a traffic flow. The new set of rules is propagated to/programmed on a plurality of switches in the communication network so that when the traffic flow is received at each of the switches, it is forwarded to traverse a new set of services, as specified by the new set of rules. Therefore, embodiments of the present invention allow for dynamically steering or redirecting traffic after deep inspection of the traffic flow. By so doing, traffic flows can bypass services that were configured in the default service path or can go through a service that was not configured in the default path. Also, embodiments of the present invention can redirect packets of a same traffic flow differently. For example, the first few packets may traverse a first set of services but the subsequent packets of the traffic flow may traverse a second set of services, which is different from the first set of services.

Some embodiments of the present disclosure will be discussed as using the Software-Defined Network (SDN) based steering network for enabling traffic steering. The SDN based steering network can be deployed using the OpenFlow (OF) protocol. However, other protocols or other methods of Software Defined Networking could also be used. SDN is a network approach that introduces programmability, centralized intelligence and abstractions of the underlying infrastructure. In SDN, the control plane applications that implement network functionalities, such as routing and switching, can evolve separately from the forwarding plane. OpenFlow is a communication protocol proposed for the interface between the control and forwarding planes in SDN.

Furthermore, embodiments of the present invention provide flexibility as they support the integration of existing and third party services with no modifications. Service instances can be located and chained in an arbitrary fashion by the network operator, and each service instance can be part of multiple service chains. The ability to steer traffic at the granularity of subscribers' traffic flows is also provided.

Figure 1:
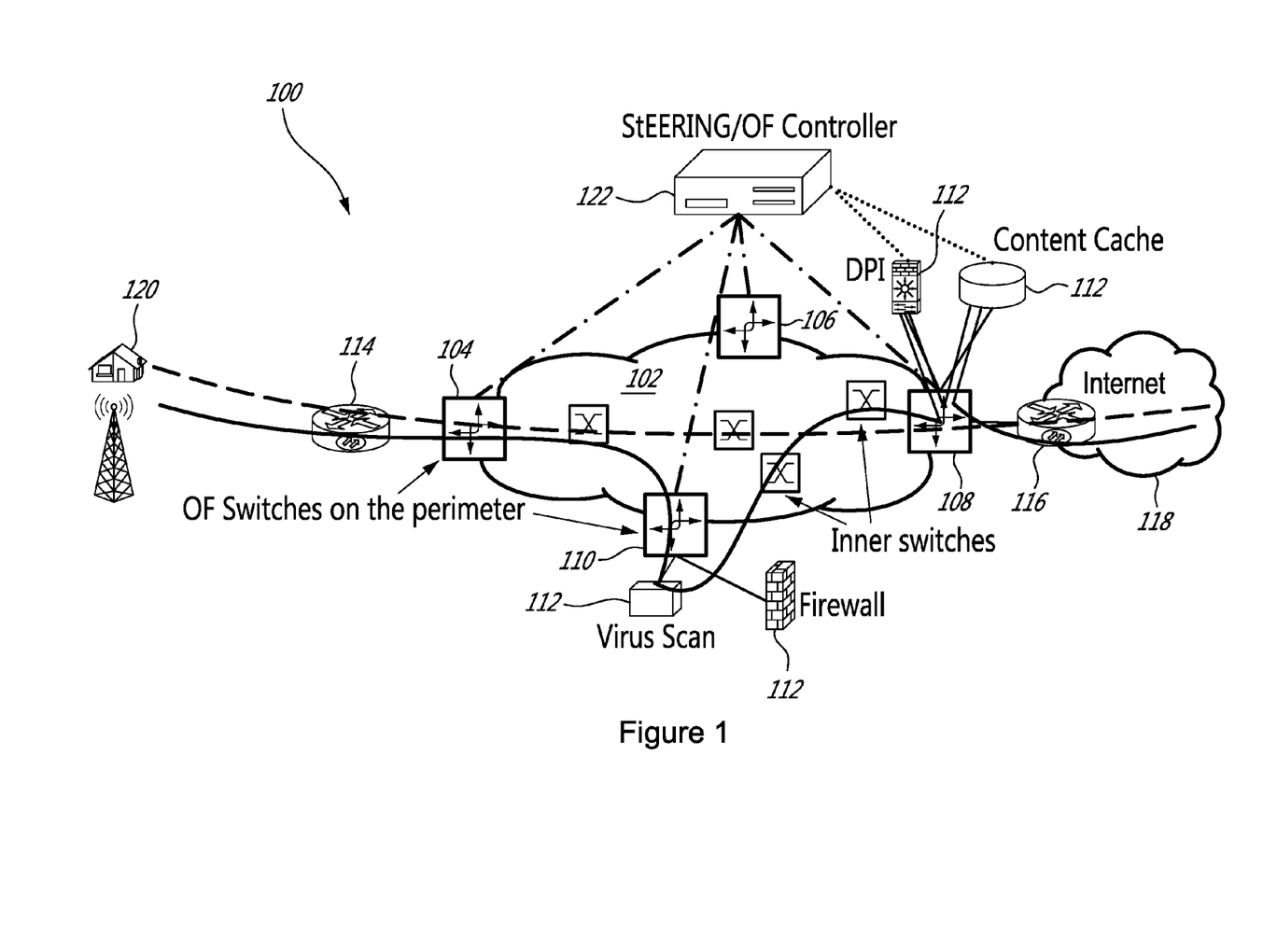
FIG. 1 is a block diagram of an embodiment of a communication network.

Referring now to FIG. 1, an exemplary communication network 100 is illustrated, which provides for traffic steering at a flow level. The communication network 100 comprises an inner network 102 which includes a plurality of switches and other components, known to the skilled person in the art, for forwarding data packets between perimeter switches using efficient layer 2 switching. Connected to the inner network 102 are the perimeter switches 104, 106, 108 and 110, which can be implemented using OpenFlow (OF) switches, while the switches in the inner network 102 can be implemented with either an OpenFlow switch or a plain/"legacy" Ethernet switch. The switches 104-110 are connected to a controller 122, which takes care of the control plane of these switches. Furthermore, a plurality of service network nodes (or services) 112, offering functionalities such as Virus Scan, Firewall, Deep Packet Inspection (DPI), etc., are connected to the communication network 100 through the perimeter switches 104-110. The communication network 100 also comprises an access node, such as a Border Network Gateway (BNG) 114, and an edge router 116 connected to internet 118 or another communication network. The BNG 114 allows an end-user device 120 to access the internet 118 or another network through the communication network 100.

It should be noted that the steering network, provided by the inner network 102 and the perimeters switches 104-110, is a single Layer 2 domain. There can be multiple instances of a service. The number of communication network nodes, routers or switches is only exemplary in FIG. 1. There can be more or less such entities in a communication network depending on its size and other factors.

In the communication network 100, a network operator is able to define service policies that specify traffic classes and the chain of services that each class must traverse. These policies are translated by the controller into rules that are programmed on the switches in the communication network. These rules steer the network traffic through the ordered chain of services as specified by the policies.

Traffic steering which is based on shallow packet inspection, i.e. inspection of layer 2 to layer 4 (L2-L4) packet header information, can be defined as basic traffic steering. Basic traffic steering does not use any deeper inspection of the packet (such as inspection of layers 5 to 7), i.e. it does not involve any per-flow forwarding rules. Rather, the forwarding rules are derived from subscriber and application policies.

Subscriber-based policies are policies that are defined on a per subscriber basis. These policies specify the Internet Protocol (IP) address of the subscriber and the set of services that each particular subscriber's traffic should traverse.

An application represents an end-user Internet application such as Youtube™, a type of traffic such as Hypertext Transfer Protocol (HTTP), or a combination of both. In basic steering, these types of policies are defined using layer 3 and layer 4 information, either in terms of an IP address block and/or a User Datagram Protocol (UDP)/Transmission Control Protocol (TCP) port. For example, YouTube™ can be identified by a destination IP address and HTTP applications can be determined based on the ports, such as the well-known port 80.

Application-based policies are specified on a per application basis and apply to all subscribers. They refine subscriber-based policies by adding or removing services from the set of services specified in the subscriber-based policies.

The steering paths or sets of services for basic traffic steering can be set up a priori at the granularity of subscribers and applications, i.e. they are predefined for all the traffic flows belonging to the same subscriber or the same application. The sets of services defined for the basic traffic steering mechanism are in effect from the first packet of a traffic flow, e.g. TCP SYN packet, until the last packet of the traffic flow. Generally, basic traffic steering is used to provide the default service path configured by a controller.

However, basic traffic steering is not flexible for redirecting traffic upon deeper inspection of the traffic flow, or within flows of the same subscriber or same application. Therefore, embodiments of the present invention provide for complex traffic steering, which allows for dynamically redirecting packets of a traffic flow through different service sets, based on the results of a deeper inspection of the traffic flow.

More specifically, complex traffic steering is based on installing per-flow forwarding rules dynamically, in response to the first few packets of a traffic flow being processed by a service network node. To do so, deep packet inspection (DPI) based on inspection of layer 5 to layer 7 (L5-L7) traffic flow contents and/or traffic pattern matching and/or heuristics can be used. These per-flow rules are installed by the controller in response to notification messages from the service network node, such as a DPI node. Therefore, complex traffic steering is based on flow policies. The flow policies are used to dynamically override subscriber and application policies (provided by the basic traffic steering) for specific flows. The forwarding rules derived from these policies can be pushed dynamically by the controller, even in mid-flow to the plurality of switches, effectively re-steering the rest of the traffic flow towards a different set of services.

In complex traffic steering, a new communication protocol has been defined, referred to as the steering Service Protocol (StSP). Similar to the OpenFlow interface between the switches and the controller, the StSP interface runs directly over Transmission Control Protocol (TCP) or is encrypted using Transport Layer Security (TLS). StSP includes the following message types.

Registration message: this message allows services or service network nodes to register and establish a connection with the controller. The registration message includes information that uniquely identifies the service network node.

Keep alive message: this message is used to monitor the health of both the service network nodes and the controller. It can be initiated by either the controller or the service network node. The receiving end must respond to the request.

Flow notification message: in this message, the service network node sends the traffic characteristic information of a traffic flow to the controller. The traffic characteristic information is used by the controller for determining if there is a need to create a new set of rules. The traffic characteristic information can be extracted from any of the layers 5 to 7 which characterizes or classifies the traffic flow. Also, traffic pattern matching and heuristics can be used. This is an unsolicited or asynchronous message. More specifically, this message includes:

1) traffic flow identification which contains a n-tuple identification for uniquely identifying a traffic flow. For example, the n-tuple can be a 5-tuple identification, including a source IP, a destination IP, a protocol, a source port and a destination port.
2) traffic characteristic information, provided by inspecting layers 5 to 7 of a packet header or using traffic pattern matching and heuristics. For example, the traffic characteristic information can be a traffic type, Session Initiation Protocol (SIP), Uniform Resource Locator (URL), etc.
3) statistics: this information is optional, it gives the number of packets received for this traffic flow to the controller.

Load Monitoring message: the controller may also monitor the load (e.g. CPU load) of the services. This message assists with load balancing the traffic sent to the service instances. This is a request/response message initiated by the controller.

Figure 2:
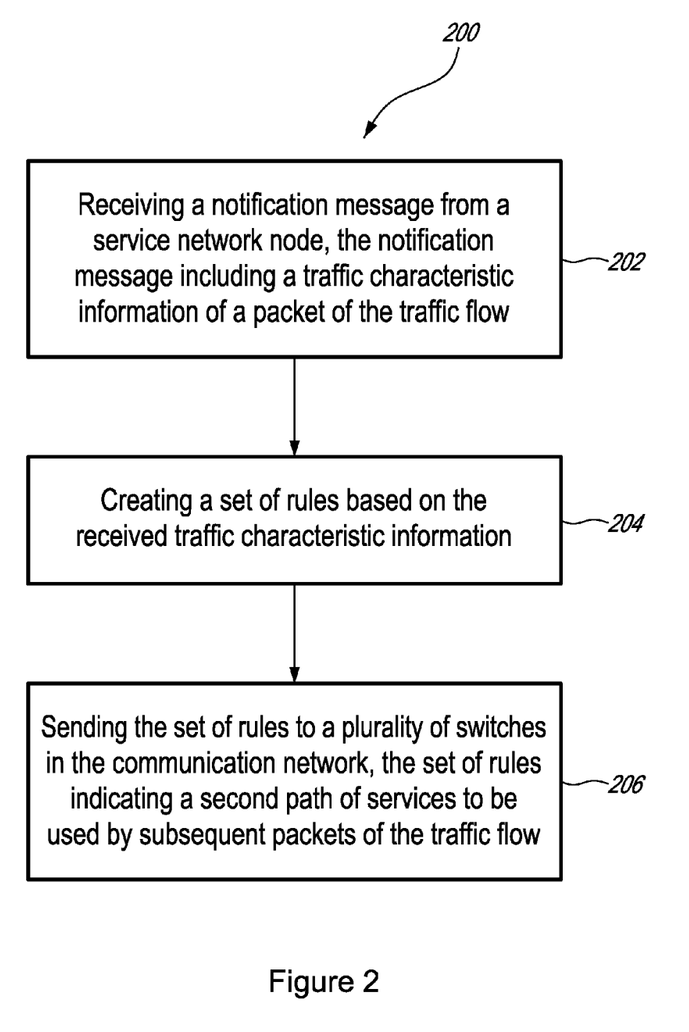
FIG. 2 is a flow chart of a method for redirecting traffic flow in the communication network of FIG. 1, according to an embodiment of the present invention.

Now, turning to FIG. 2, a method 200 for redirecting a traffic flow in a communication network such as 100 will be described. The method can be implemented in the controller 122.

Method 200 starts with step 202 in which a notification message from a service network node is received. For example, the controller 122 may receive this notification message using the StSP protocol. The notification message may include traffic characteristic information, obtained by deep packet inspection, which includes extracting information from layers 5 to 7, traffic pattern matching, using heuristics. The service network node, such as a DPI node can obtain that information. For example, the traffic characteristic information can be the type of traffic, or a Uniform Resource Locator (URL). The notification message also includes other information, such as a n-tuple identification which uniquely identifies the traffic flow to which the packet belongs.

In step 204, based on the traffic characteristic information received from the service network node (at step 202), the controller 122 creates a set of rules to be applied to the subsequent packets of the identified traffic flow.

In step 206, the controller 122 propagates or sends the set of rules to the plurality of switches so that the subsequent packets of the traffic flow will traverse a second service path, as indicated by the set of rules. As an alternative, the set of rules could be sent only to the particular switches that will handle the traffic flow.

The n-tuple identification that uniquely identifies the traffic flow allows the controller 122 to associate the created set of rules with the traffic characteristic information. For example, the controller 122 sends the set of rules in a flow message to the plurality of switches for this identified/recognized traffic flow (through its n-tuple) with associated actions such as drop the packet, forward the packet to the next service network node, etc. Therefore, the set of rules including the n-tuple identification of the traffic flow and the associated actions. When the switches receive a traffic flow that corresponds to the n-tuple identification, the switches apply the associated actions of the set of rules to the received traffic flow.

For example, a service network node can be provided by a virtual machine (VM). In a cloud or virtual environment, where location and instances of services change as the availability of the resources change, the controller can use method 200 to decide to redirect some traffic flows to bypass some particular VMs. Method 200 can be also used in the context of load balancing, when some VMs experience an increase of traffic compared to other VMs in the network.

Figure 3:
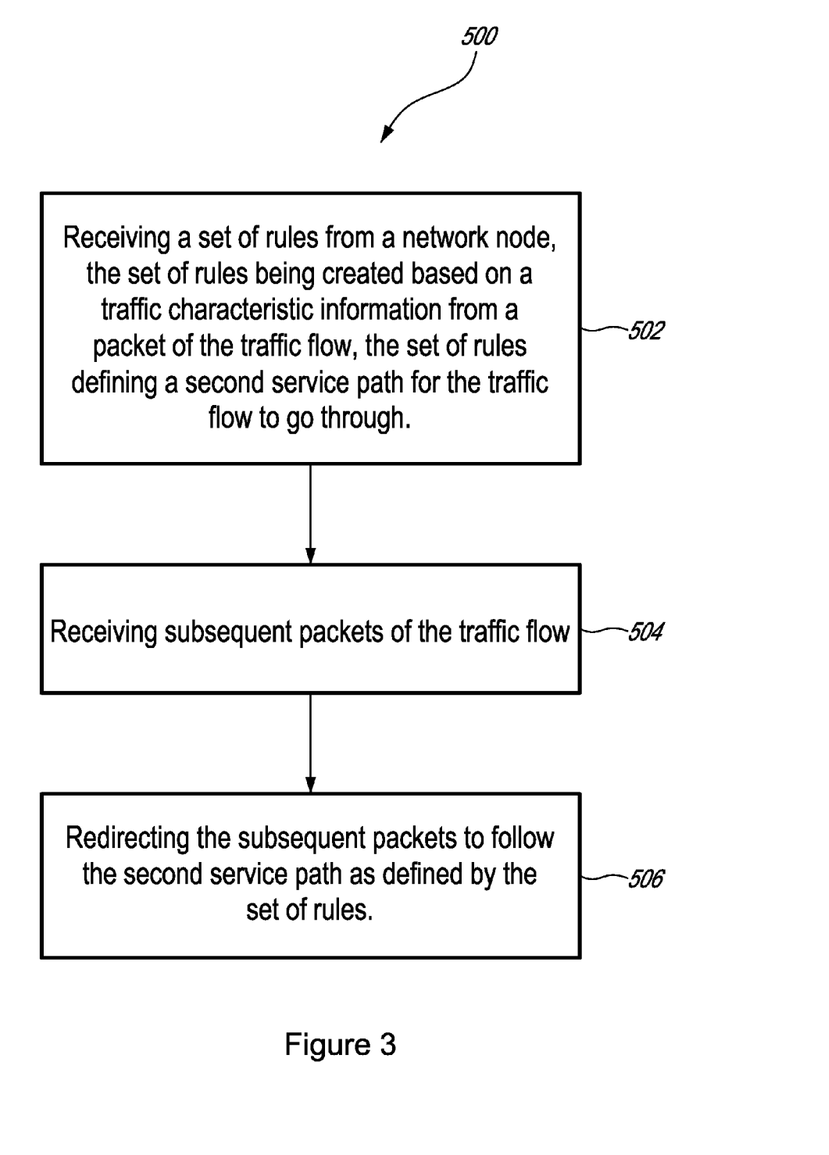
FIG. 3 is a flow chart of a method for redirecting traffic flow in the communication network of FIG. 1, according to another embodiment of the present invention.
Figure 4:
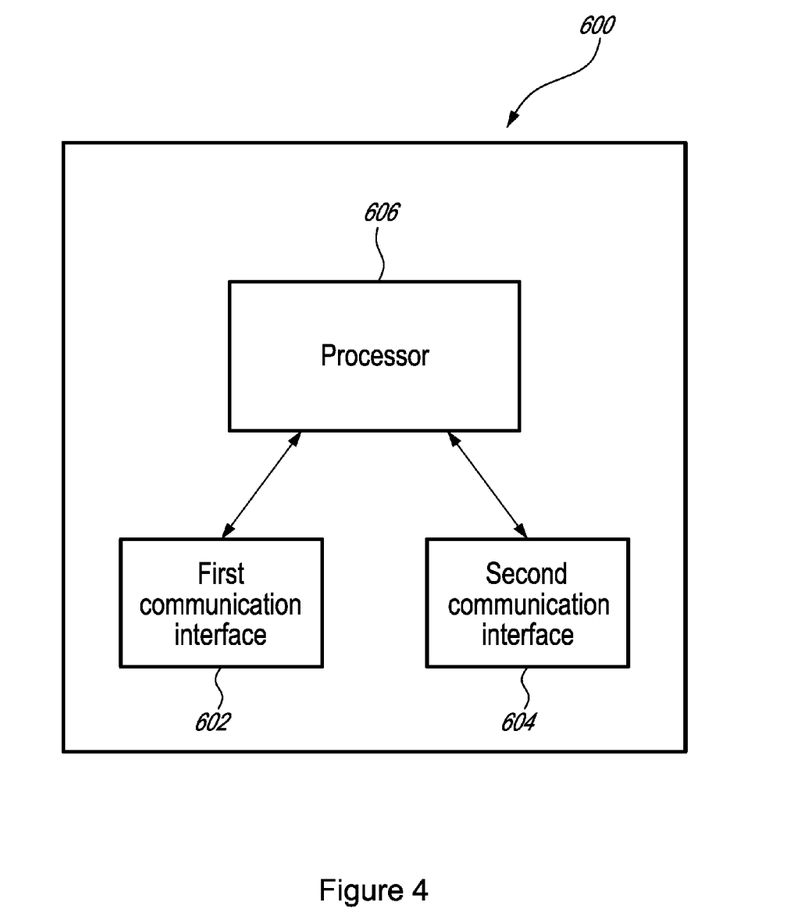
FIG. 4 is a switch in which the method of FIG. 3 is carried out, according to an embodiment of the present invention.

Now, with reference to FIGS. 3 and 4, a method 500 performed in a switch 600 will be described. Method 500 is used for redirecting a traffic flow in a communication network, such as 100. It is assumed that a first (or default) service path has been configured in the controller 122 for the traffic flow to go through. The switch 600 can be any of the plurality of perimeter switches 104-110. The switch 600 has first and second communication interfaces 602 and 604, operationally connected to a processor 606. The switch 600 may comprise other components (not shown) and other processors and memories for performing tasks and procedures of the present invention and other usual tasks and procedures, which are well known in the art and thus will not be described further. The first and second communication interfaces could be two different communication interfaces or could be the same communication interface.

Method 500 starts with step 502 in which the switch 600 receives a set of rules from a network node, such as the controller 122, the set of rules being created based on a traffic characteristic information from a packet of the traffic flow by a service network node, the set of rules defining a second service path for the traffic flow to go through. The switch 600 may receive the set of rules through its first communication interface 602.

In step 504, the switch 600 receives subsequent packets of the traffic flow, through its second communication interface 604.

In step 506, the switch 600, through the processor 606, redirects the subsequent packets to follow the second service path as defined by the set of rules.

Figure 7:
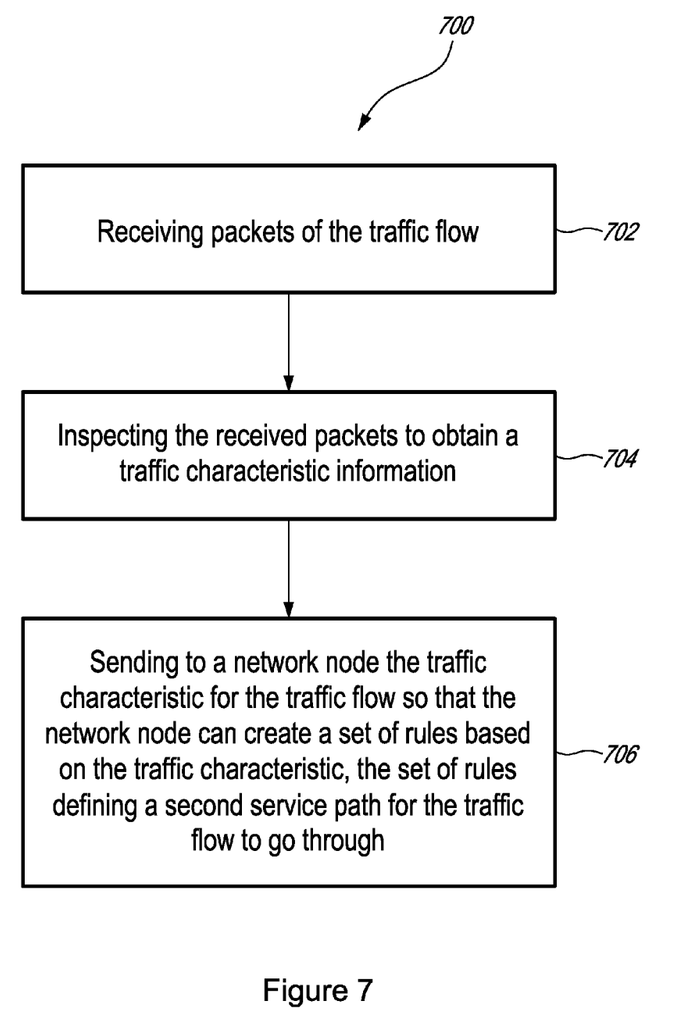
FIG. 7 is a flow chart of a method for triggering traffic flow redirection in the communication network of FIG. 1, according to another embodiment of the present invention.
Figure 8:
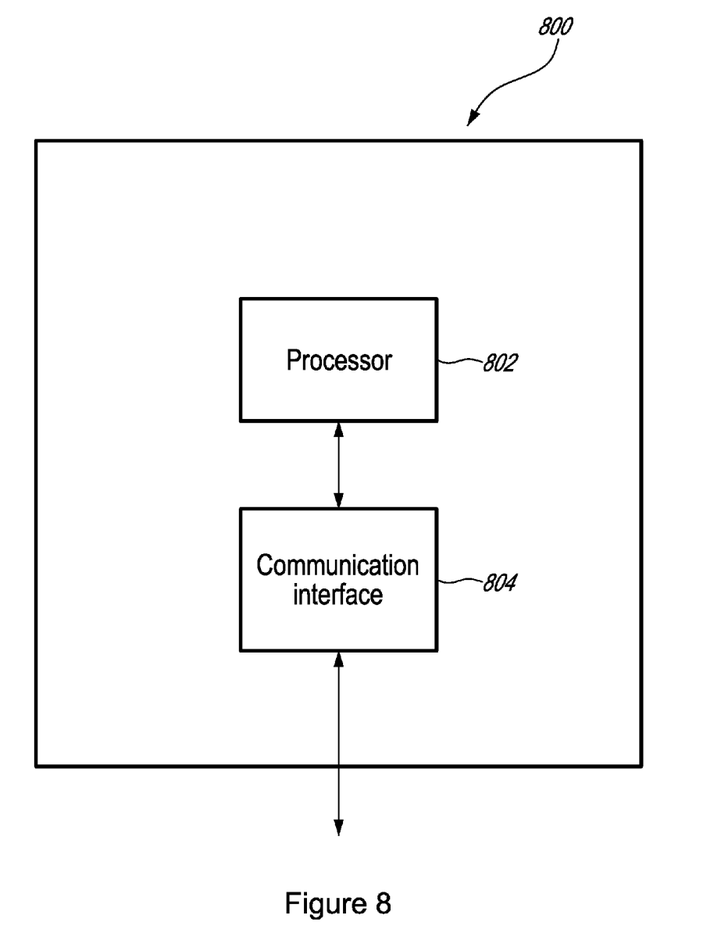
FIG. 8 is a service network in which method 7 is carried out, according to an embodiment of the present invention.

Now with reference to FIGS. 7 and 8, a method 700 performed in a service network node 800 will be described. Method 700 is used for triggering a traffic flow redirection in a communication network, such as 100. It is assumed that a first (or default) service path has been configured in the controller 122 for the traffic flow to go through. The service network node 800 can be a DPI node or any other network node that can inspect a packet. The service network node 800 has a processor 802 operationally connected to a communication interface 804. The service network node 800 may comprise other components (not shown) and other processors and memories for performing tasks and procedures of the present invention and other usual tasks and procedures, which are well known in the art and thus will not be described further.

Method 700 starts with step 702 in which the communication interface 804 of the service network node 800 receives packets of the traffic flow.

In step 704, upon receiving the packets, the processor 802 of the service network node 800 inspects the packet to obtain the traffic characteristic information, using for example, deep packet inspection.

In step 706, the communication interface 804 sends a notification message, which comprises the traffic characteristic information of the traffic flow to a network node such as the controller 122, for example. The notification message includes also a n-tuple identification which uniquely identifies the traffic flow. The controller 122 can create a set of rules defining a second service path for the subsequent packets of the traffic flow to go through.

Figure 5:
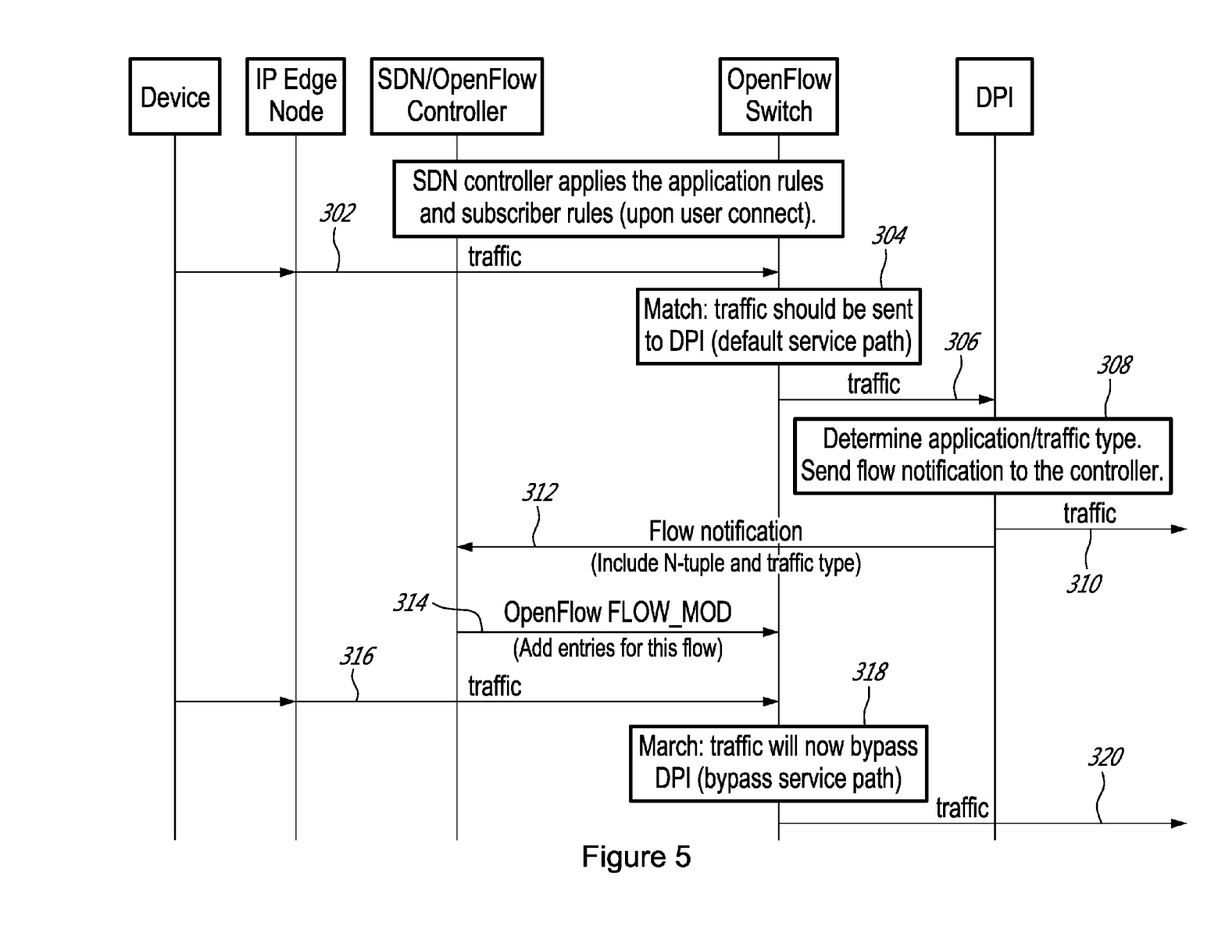
FIG. 5 is an exemplary flow diagram of traffic steering or redirection according to an embodiment of the present invention.

As a more detailed example, FIG. 5 illustrates a flow diagram 300 of complex traffic steering or redirecting, using DPI for inspecting the traffic of the end-user's device 120, in the communication network 100. It should be noted that any other service network node can be used, other than the DPI, which can analyze packet headers at layers 5 to 7 or use traffic pattern matching or heuristics to extract the traffic characteristic information. Also, the controller 122 has already configured a default or first service path (which includes an ordered set of services) for the traffic of the end-user device 120. The default set of services could have been set based on the subscriber policies or application policies or a combination of both. Once the end-user device 120 connects to the BNG 114 and sends traffic over the communication network 110, the default set of services is applied to the traffic of the end-user device 120. Furthermore, it is assumed that all the authentication procedures, for allowing the end-user device 120 to connect to the communication network 100, or internet or other communication network, have been performed and were successful.

The flow diagram 300 starts with the end-user device 120 sending a traffic flow to the communication network 100, via a switch, such as 104 (step 302).

Upon receiving the first few packets of the traffic flow, the switch identifies the traffic flow as traffic belonging to a subscriber or to an application. If there is a match between the traffic flow and a particular subscriber's or application's traffic (step 304), the traffic is sent to the DPI (step 306), as specified by the default path. If there is no match, the packets are discarded; alternatively, the packets could be sent to the default path.

Upon receiving the first few packets, the DPI node inspects the header of these packets, at the layers 5 to 7 to extract the traffic characteristic information. Also, the DPI could use traffic pattern matching or heuristics to obtain the traffic characteristic information. The traffic characteristic information can be a type of traffic and the DPI determines that the traffic flow is a long lived flow, such as a video traffic, for example. The DPI node also determines a n-tuple identification of the traffic flow (step 308) for uniquely identifying this traffic flow. Then, the DPI node sends a notification message to the controller 122 (step 312), using the StSP protocol. The notification message includes information that uniquely identifies the traffic flow, such as the n-tuple, or more specifically a 5-tuple, i.e. source and destination addresses, source and destination ports and protocol, and the traffic characteristic information, such as the traffic type, e.g. SIP, HTTP, URL, video, etc. The notification message can further contain statistic information such as the number of packets received for this traffic flow.

The first few packets of the traffic flow that were inspected by the DPI node are sent to the next service, as specified by the first service path (step 310).

When the controller 122 receives the notification message from the DPI node, it creates a new set of rules to be applied to the subsequent packets of the traffic flow. Based at least on the received traffic characteristic information, the controller 122 determines a new or second service path to be applied to the rest of the traffic flow, identified by its n-tuple. The determination of the second service path based on the traffic characteristic information can also take into consideration the configured application and subscriber policies.

For example, the controller 122 can decide to bypass the DPI node, or any particular service, in the second service path configured for the subsequent packets of the traffic flow. The controller 122 can also decide to add a service in the default service path such as IDS for suspicious traffic, for example. Then, the controller 122 sends the appropriate flow modifications to the switches in a message so that the switches can modify their flow entries to implement the new set of rules for re-steering the rest of the traffic flow accordingly (step 314). For OF switches, the message is called FLOW_MOD. The subsequent packets from this traffic flow will be steered in the communication network according to the new rules and new service path.

For example, when the switch receives subsequent packets of the traffic flow (step 316), it checks if there is a match between the n-tuple identification of the traffic flow to which the received packets belong and a n-tuple identification for a traffic flow in its table. If there is a match, the corresponding new set of rules is retrieved (step 318). According to the new rules, these packets will bypass the DPI node and be sent to another service network node (step 320), as specified by the second service path, for example.

It should be understood that the above described traffic re-steering mechanism can be also applied in mid-flow, not just within the first packets of the traffic flow. Therefore, re-steering packets within a traffic flow can happen at any time during the flow, upon receiving a notification message from a service network node.

It should be also contemplated that depending on the received traffic characteristic information, the controller 122 may decide not to create and send a new set of rules to the plurality of switches but keep the first service path for the rest of the traffic flow. In this case, the subsequent packets of the traffic flow will take the default service path in the communication network.

Figure 6:
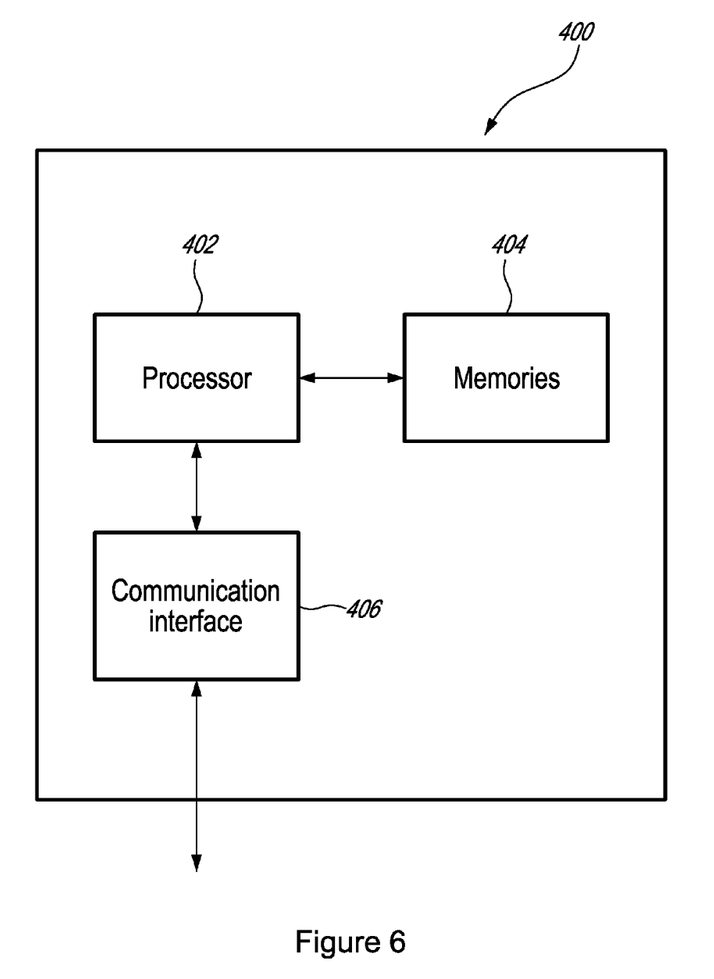
FIG. 6 is a block diagram of a network node for steering or redirecting traffic, according to an embodiment of the present invention.

Now turning to FIG. 6, a block diagram of a network node 400 according to embodiments of the present invention will be described in more detail. The network node 400 could be implemented as the controller 122 of FIG. 1, for example.

The network node 400 has a processor 402, operationally connected to a memory or plurality of memories 404, and further operationally connected to a communication interface 406.

The communication interface 406 may have an input and output and is configured to communicate with entities of a communication network, such as 100. For example, the communication interface allows for receiving, through its input, messages such as a notification message from a service network node. The notification message includes the traffic flow identification (e.g. n-tuple) and traffic characteristic information of a packet of a subscriber's traffic flow.

The processor 402 is configured to create a set of rules based on the received traffic flow identification and characteristic information and on configured application and subscriber policies, with the help of the memories 404. The traffic characteristic information can be a type of traffic, a URL, etc.

Once the set of rules are created, the communication interface 406, through its output, sends the set of rules to all the switches so that they can implement and apply the rules to all incoming traffic.

Of course, the network node 400 may also comprises a plurality of other components (not shown), such as other processors or memories, for performing tasks and procedures of the present invention and other usual tasks and procedures, which are well known in the art and thus will not be described further.

As advantages, complex steering provides more granular control over traffic flows based on higher-level application information, such as URLs. This level of granularity allows for saving money by selectively redirecting a traffic flow to or away from specific services.

Embodiments of the invention may be represented as a hardware and/or a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for redirecting a traffic flow of an end-user in a communication network, in which a first service chain has been configured for the traffic flow to go through, the method comprising:
   receiving a message from a service network node, the message including a traffic characteristic information of at least a first packet of the traffic flow of the end-user;
   in response to receiving the message, creating a set of rules based on the received traffic characteristic information of the at least first packet of the traffic flow; and
   sending the set of rules to a plurality of switches in the communication network, the set of rules indicating a second service chain for subsequent packets of the traffic flow to traverse while the at least first packet of the traffic flow traverses the first service chain, the second service chain comprising an ordered set of services provided by a plurality of service network nodes and the second service chain being different from the first service chain.

2. The method of claim 1, wherein the message further comprises information that uniquely identifies the traffic flow.

3. The method of claim 1, wherein the traffic characteristic information is obtained through deep packet inspection of the at least first packet by the service network node.

4. The method of claim 1, wherein the traffic characteristic information comprises a Uniform Resource Locator (URL) information.

5. The method of claim 1, wherein the traffic characteristic information comprises a traffic type information.

6. The method of claim 1, wherein the message further comprises information regarding statistics of the traffic flow.

7. The method of claim 1, wherein receiving the message comprises using a steering service protocol.

8. The method of claim 1, wherein creating the set of rules comprises bypassing a particular service.

9. The method of claim 1, wherein creating the set of rules comprises keeping the first service chain.

10. The method of claim 1, wherein sending the set of rules comprises sending flow entry modifications to the plurality of switches.

11. A network node for redirecting a traffic flow of an end-user in a communication network, in which a first service chain has been configured for the traffic flow to go through, the network node comprising:
   a communication interface for receiving a message from a service network node, the message including traffic characteristic information of at least a first packet of the traffic flow of the end-user;
   and a processor operationally connected to the communication interface and configured to create a set of rules based on the received traffic characteristic information of the at least first packet of the traffic flow;
   wherein the communication interface further sends the set of rules to a plurality of switches in the communication network, the set of rules indicating a second service chain to for subsequent packets of the traffic flow to traverse while the at least first packet of the traffic flow traverses the first service chain, the second service chain comprising an ordered set of services provided by a plurality of service network nodes and the second service chain being different from the first service chain.

12. The network node of claim 11, wherein the message further comprises information that uniquely identifies the traffic flow.

13. The network node of claim 11, wherein the traffic characteristic information is obtained through deep packet inspection of the at least first packet by the service network node.

14. The network node of claim 11, wherein the traffic characteristic information comprises a URL information.

15. The network node of claim 11, wherein the traffic characteristic information comprises a traffic type information.

16. The network node of claim 11, wherein the message further comprises information regarding statistics of the traffic flow.

17. The network node of claim 11, wherein the communication interface uses a steering service protocol for receiving the message.

18. The network node of claim 11, wherein the processor decides to bypass a particular service when creating the set of rules.

19. The network node of claim 11, wherein the processor decides to keep the first service chain when creating the set of rules.

20. The network node of claim 11, wherein the communication interface sends the set of rules as flow entry modifications to the plurality of switches.

21. The network node of claim 11, wherein the service network node is a Deep Packet Inspection (DPI) node.

22. A method for redirecting a traffic flow of an end-user in a communication network, in which a first service chain has been configured for the traffic flow to go through, the method comprising:
   receiving a set of rules from a network node, the set of rules being created based on a traffic characteristic information from at least a first packet of the traffic flow of the end-user, the set of rules defining a second service chain for the traffic flow to go through;
   receiving subsequent packets of the traffic flow; and
   redirecting the received packets to follow the second service chain as defined by the set of rules, while the at least first packet follows the first service chain, the second service chain comprising an ordered set of services provided by a plurality of service network nodes and the second service chain being different from the first service chain.

23. A switch for redirecting a traffic flow of an end-user in a communication network, in which a first service chain has been configured for the traffic flow to go through, the switch comprising:
   a first communication interface for receiving a set of rules from a network node, the set of rules being created based on a traffic characteristic information extracted from at least a first packet of the traffic flow of the end-user, the set of rules defining a second service chain for the traffic flow to go through;
   a second communication interface for receiving subsequent packets of the traffic flow; and
   a processor operationally connected to the first and second communication interfaces, the processor configured to:
   redirect the received packets to follow the second service chain as defined by the set of rules, while the at least first packet follows the first service chain, the second service chain comprising an ordered set of services provided by a plurality of service network nodes and the second service chain being different from the first service chain.

24. A method for triggering redirection of an end-user traffic flow in a communication network, in which a first service chain has been configured for the traffic flow to go through, the method comprising:

receiving at least a first packet of the traffic flow of the end-user;

inspecting the received at least first packet to obtain a traffic characteristic; and sending to a network node the traffic characteristic for the traffic flow so that the network node can create a set of rules based on the traffic characteristic, the set of rules defining a second service chain for subsequent packets of the traffic flow to go through, while the at least first packet follows the first service chain, the second service chain comprising an ordered set of services provided by a plurality of service network nodes and the second service chain being different from the first service chain.

25. The method of claim 24, further comprising determining an identification that uniquely identifies the traffic flow.

26. A service network node for triggering redirection of an end-user traffic flow in a communication network, in which a first service chain has been configured for the traffic flow to go through, the service network node comprising:

a communication interface for receiving at least a first packet of the traffic flow of the end-user; and a processor operationally connected to the communication interface and configured for inspecting the received at least first packet to obtain a traffic characteristic;

wherein the communication interface further sends to a network node the traffic characteristic for the traffic flow so that the network node can create a set of rules based on the traffic characteristic, the set of rules defining a second service chain for subsequent packets of the traffic flow to go through, while the at least first packet follows the first service chain, the second service chain comprising an ordered set of services provided by a plurality of service network nodes and the second service chain being different from the first service chain.

27. The service node of claim 26, wherein the processor further determines an identification that uniquely identifies the traffic flow.

* * * * *